(12) United States Patent
Doucement

(10) Patent No.: US 11,671,043 B2
(45) Date of Patent: Jun. 6, 2023

(54) DEVICE AND METHOD FOR MONITORING THE TORQUE OF A BRUSHLESS AC MOTOR

(71) Applicant: Hella GmbH & Co. KGaA, Lippstadt (DE)

(72) Inventor: Jean Doucement, Cordes-Tolosannes (FR)

(73) Assignee: Hella GmbH & Co. KGaA, Lippstadt (DE)

(*) Notice: Subject to any disclaimer, the term of this patent is extended or adjusted under 35 U.S.C. 154(b) by 0 days.

(21) Appl. No.: 17/337,174

(22) Filed: Jun. 2, 2021

(65) Prior Publication Data

US 2021/0288600 A1 Sep. 16, 2021

Related U.S. Application Data

(63) Continuation of application No. PCT/EP2019/051179, filed on Jan. 17, 2019.

(51) Int. Cl.
*H02P 21/20* (2016.01)
*H02P 21/13* (2006.01)

(52) U.S. Cl.
CPC ............ *H02P 21/20* (2016.02); *H02P 21/13* (2013.01)

(58) Field of Classification Search
CPC .. H02P 21/20; H02P 6/17; H02P 27/12; H02P 25/024
See application file for complete search history.

(56) References Cited

U.S. PATENT DOCUMENTS

| | | | |
|---|---|---|---|
| 4,978,895 A | 12/1990 | Schwarz | |
| 2014/0306638 A1* | 10/2014 | Wu | H02P 21/20 318/504 |

FOREIGN PATENT DOCUMENTS

| | | |
|---|---|---|
| CN | 103117693 B | 1/2015 |
| CN | 107370436 A | 11/2017 |
| EP | 1843462 A1 | 10/2007 |

OTHER PUBLICATIONS

T. D. Batzel and K. Y. Lee, "Electric propulsion with sensorless permanent magnet synchronous motor: implementation and performance," in IEEE Transactions on Energy Conversion, vol. 20, No. 3, pp. 575-583, Sep. 2005. (Year: 2005).*

* cited by examiner

*Primary Examiner* — Said Bouziane
(74) *Attorney, Agent, or Firm* — Husch Blackwell LLP

(57) ABSTRACT

A torque monitoring device is provided for a brushless AC motor. The device comprises an observer having inputs for voltages (Va, Vb, Vc) across windings of the brushless AC motor, having an input for an angular velocity ($\omega_s$) of a rotor of the brushless AC motor, and an input for a pole wheel angle ($\theta_s$) of the brushless AC motor.

12 Claims, 7 Drawing Sheets

DEVICE AND METHOD FOR MONITORING THE TORQUE OF A BRUSHLESS AC MOTOR

CROSS REFERENCE

This application claims priority to PCT Application No. PCT/EP2019/051179, filed Jan. 17, 2019, the entirety of which is hereby incorporated by reference.

FIELD OF THE INVENTION

The invention is about a device and a method for monitoring the torque of a brush-less AC motor.

BACKGROUND

Brushless AC motors are often used as servo motors, for example in power steering systems for steering vehicles. With power steering it is a challenge to ensure that the current of the servo motor is adjusted by a control unit so that the actual torque corresponds to the required torque. A problem with conventional power steering systems is that the actual torque cannot be measured directly. These problems can be caused, for example, by user interference or road conditions influencing the behaviour of the power steering.

An approach known to the inventor is to get a value of the torque to estimate the actual torque based on the phase currents. An observer is designed to calculate the actual torque based on the phase currents. This observer may be subject to failure of the electronic used. Even if some diagnostics are preventing most of the critical failures, some residual FIT rate remains.

BRIEF SUMMARY OF THE INVENTION

There is therefore a need to further reduce the FIT rate. This is where this invention comes in.

This invention is based on the problem of proposing a further device and procedure to obtain a value for the current value of torque.

This task is solved according to the invention by the fact that the device has an observer. The device according the invention may have inputs for voltages across windings of the brushless AC motor, and may have an input for an angular velocity of a rotor of the brushless AC motor and an input for a pole wheel angle of the brushless AC motor.

In contrast to the solution previously known to the inventor, which is based on a calculation of the torque based on the phase currents by means of an observer, an observer is used in the device according to the invention, to which the voltages across the windings of the motor could be fed as input variables. The speed and pole wheel angle of the rotor of the brushless AC motor can also be used for the calculation. These quantities can be measured by simple means and can thus serve as a basis for a robust observation of the torque by means of an observer of an inventive device.

The voltages applied to the windings of the motor are generated from a AC voltage by means of inverters made up of power electronic components. These power electronic components of the inverters can be controlled by PWM signals. The voltages can contain harmonics which are caused, for example, by the generation of the power electronic components and their control. To minimize the influence of harmonics on the calculation of the torque, it makes sense to minimize the harmonics by means of low-pass filters.

The cut-off frequency of the low-pass filter or filters used is preferably selected so that voltages with the highest frequency of the voltages occurring across the motor windings can pass unhindered through the filter or filters. Since the rotor speed of the brushless AC motor depends on the frequency of the voltages applied across the windings, and the frequency of the voltages can be changed to adjust the rotor speed, the cut-off frequency of the filter or the cut-off frequencies of the filters are tuned to the maximum speed that the brushless AC motor is to achieve. For a motor with four pole pairs (p=4), which should achieve a maximum speed of 4000 rpm, an electrical speed of $$f_{el_{max}} = \frac{4000}{60}p = \frac{4000}{60}4 = 266 \text{ Hz}$$

is achieved. Then, for example, a filter with a cut-off frequency of 400 Hz is sufficiently designed to filter possibly interfering harmonics with a 1st order Butterworth filter.

However, filtering can result in a phase and attenuation in a range around $f_{el_{max}}$ that is preferably compensated.

The measured and filtered voltages dropping across the windings of the motor can now be digitized using one or more analogue-to-digital converters so that they can be digitally processed. Alternatively, the signals could also be processed analogously with the aid of analogue computers.

The filtered voltage signals oscillate around a curve of a continuous and continuously changing alternating voltage, which could be applied to the windings to achieve the same speed and torque. The oscillations of the filtered voltage signals are caused by the PWM signals used to control the power electronic components of the inverters. The filtered voltage signals hit this continuous and continuously changing voltage always in the middle of the pulses or the pulse pauses of the PWM signals. Preferably, therefore, the analogue-to-digital converters are controlled in such a way that the filtered voltage signals are discretized in the middle of the pulses or the pulse pauses of the PWM signals which are used to control the power electronic components of the inverters.

The compensation of the error caused by the described analogue filtering of the measured voltage signals can take place after digitization. For this purpose, a digital filter may be provided that in the frequency range of interest has a transmission behaviour that is inverse to the transmission behaviour of the analogue filter(s), so that in this frequency range of interest the effect of the analogue filter(s), i.e. the error caused by the analogue filter(s), and the effect of the digital filter neutralize each other. The error or errors of the analogue filter or filters are compensated in the frequency range of interest.

The advantageously digitized and advantageously compensated voltages can be fed to a module for transforming the voltages into a d/q space. The polar wheel angle can also be used for the d/q transformation by the module.

In the d/q space, a module can then be used to calculate the torque. The calculation module is supplied with the stresses transformed into the d/q space and the angular velocity of the rotor. In the calculation, parameters of the brushless AC motor can be taken into account as constants. These can be the following parameters: Ld direct inductance in the d/q space, Lq quadratic inductance in the d/q space, R phase resistance, p number of pole pairs, and $\varphi_f$ rotor magnet flux.

It is possible that the torque calculated with a device according to the invention is compared with a torque determined by other means or with a measured torque. To do this, a difference can be formed to calculate an error.

The module for the transformation into the d/q space and the module for the calculation of the torque are preferably parts of the observer of a device according to the invention. The observer may be implemented by software or part of software, preferably provided on an integrated circuit.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
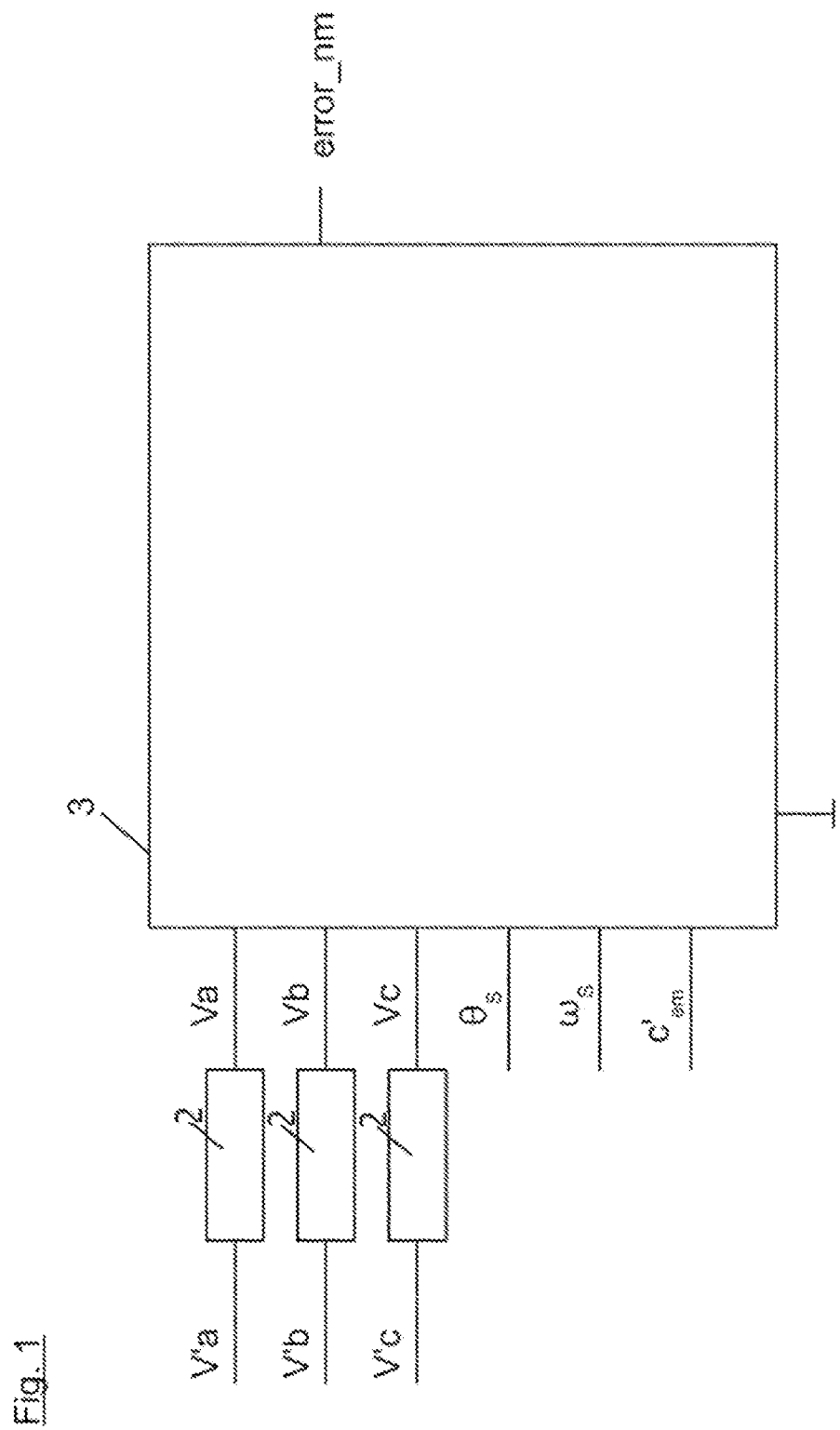
FIG. 1 is a block diagram of the invented device.
Figure 2:
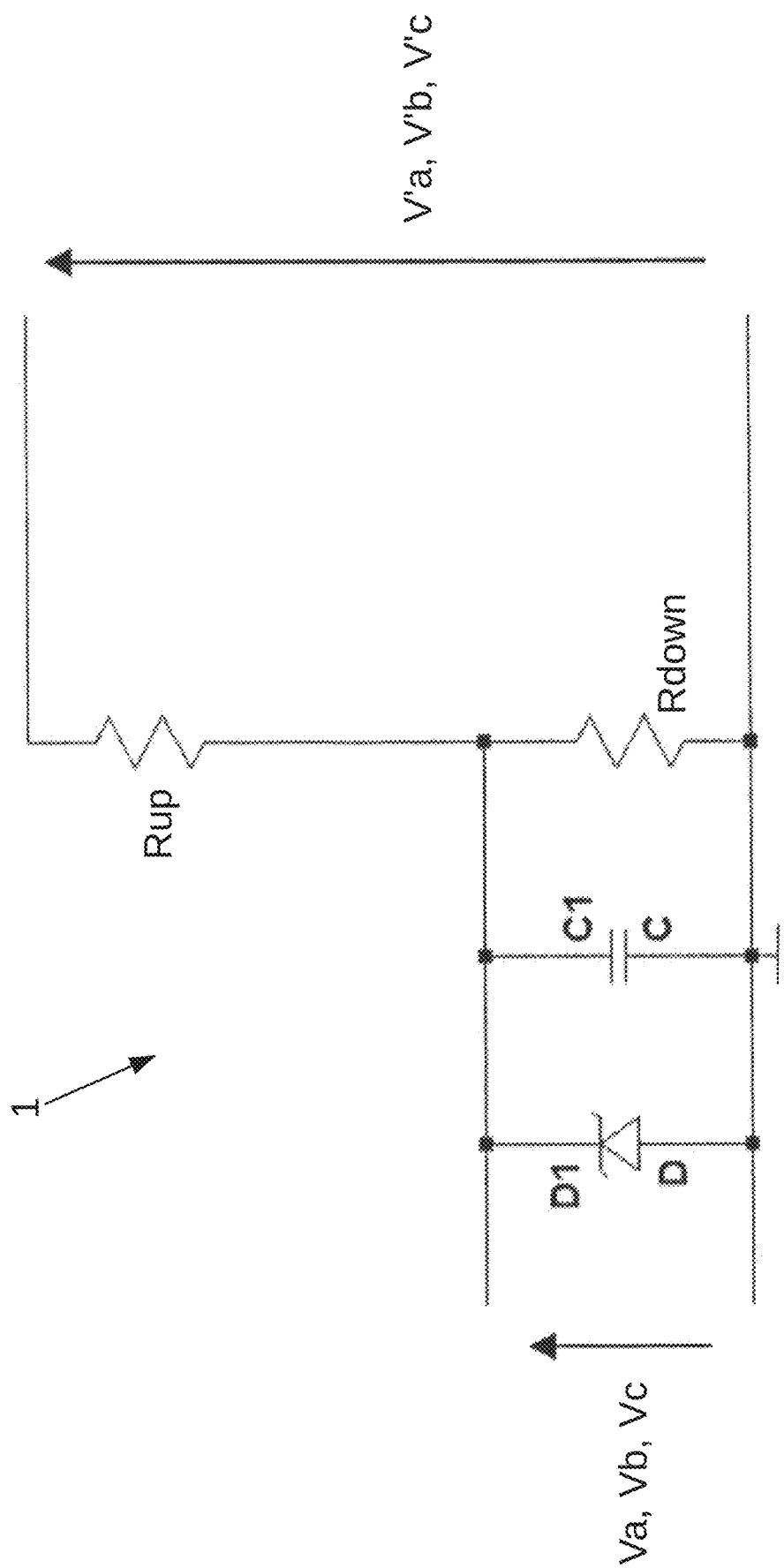
FIG. 2 is an analogue filter of the device according to the invention.

The invented device for monitoring the torque of a brushless AC motor has as hardware components voltage divider 1, filter 2 and a programmable integrated circuit 3, which is suitable for calculating the torque of the brushless AC motor.

The voltage dividers 1 have resistors Rup, Rdown, which are electrically connected in series and arranged electrically parallel to the windings of the motor. Above the resistors Rup, Rdown the same voltages drop as above the motor windings. The voltage across the resistors Rdown drops a voltage proportional to the voltages across the windings. These voltages V'a, V'b, V'c are applied to the filters 2.

Figure 3:
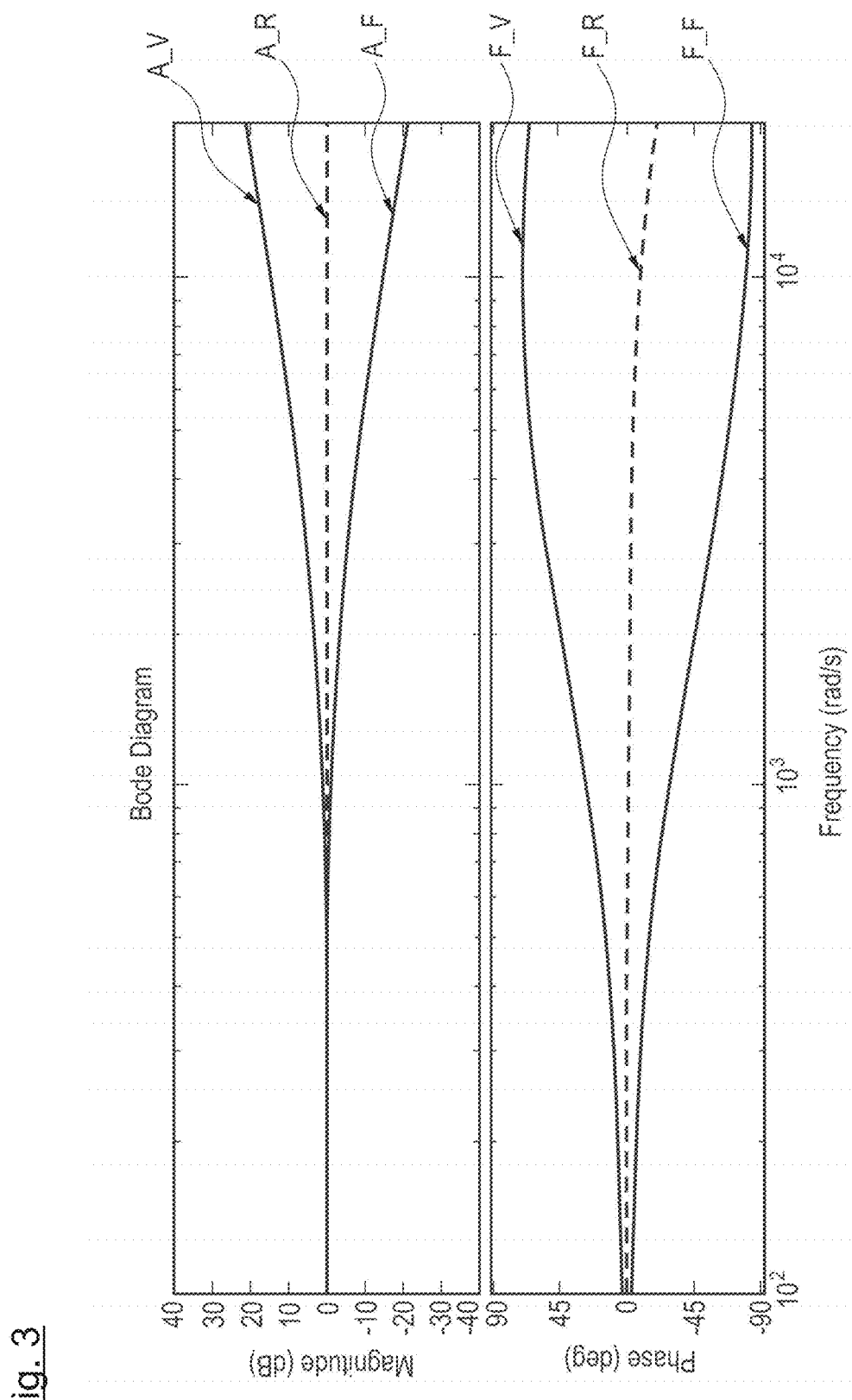
FIG. 3 is a bode diagram of the device according to invention.
Figure 4:
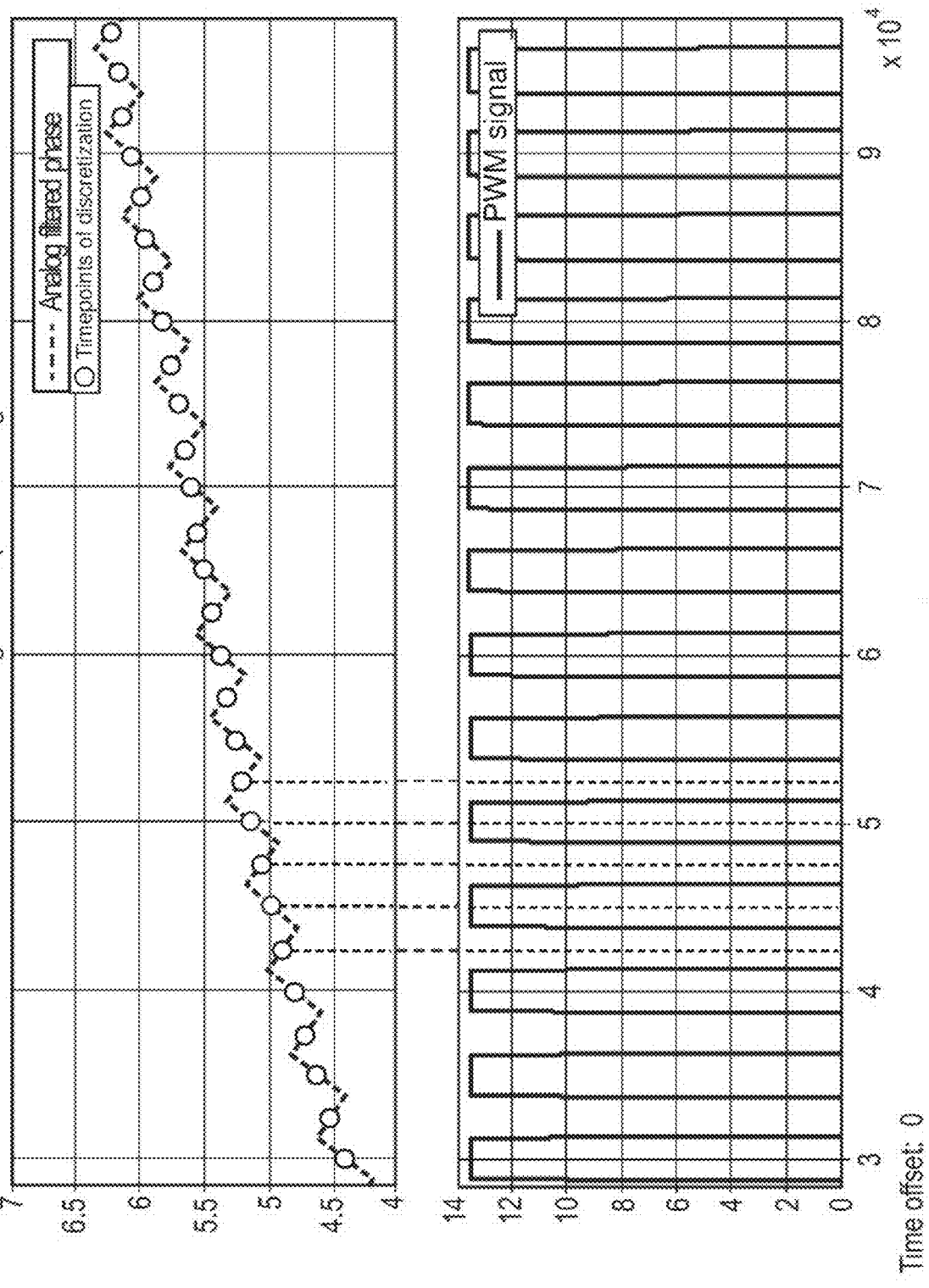
FIG. 4 shows a course of a filtered voltage across one of the windings of the motor and a PWM signal to generate the voltage across the winding.

Filters 2 are low-pass filters whose cut-off frequency is selected in such a way that harmonics caused by the generation of alternating voltages falling over the windings are damped. Amplitude errors and phase errors in the output voltages of filter 2 caused by filter 2 cannot be avoided, but they can be compensated, which will be explained later. In the bottom diagram of FIG. 3, the amplitude response and the frequency response of filter 2 are marked with the reference signs A_F and F_F respectively.

The filtered voltages Va, Vb, Vc are fed to the integrated circuit 3, for which the outputs of filter 2 are connected to the inputs of circuit 3.

Circuit 3 also has an input to which a signal is applied indicating the angular speed $\omega_s$ of the rotor. At another input there is a signal which indicates the polar wheel angle $\theta_s$.

Furthermore, circuit 3 is supplied via an input with a signal obtained outside the device according to the invention which indicates the torque $c'_{em}$. This is compared within the device according to the invention with the torque $c_{em}$ determined in the device. A difference error_nm is calculated.

Figure 5:
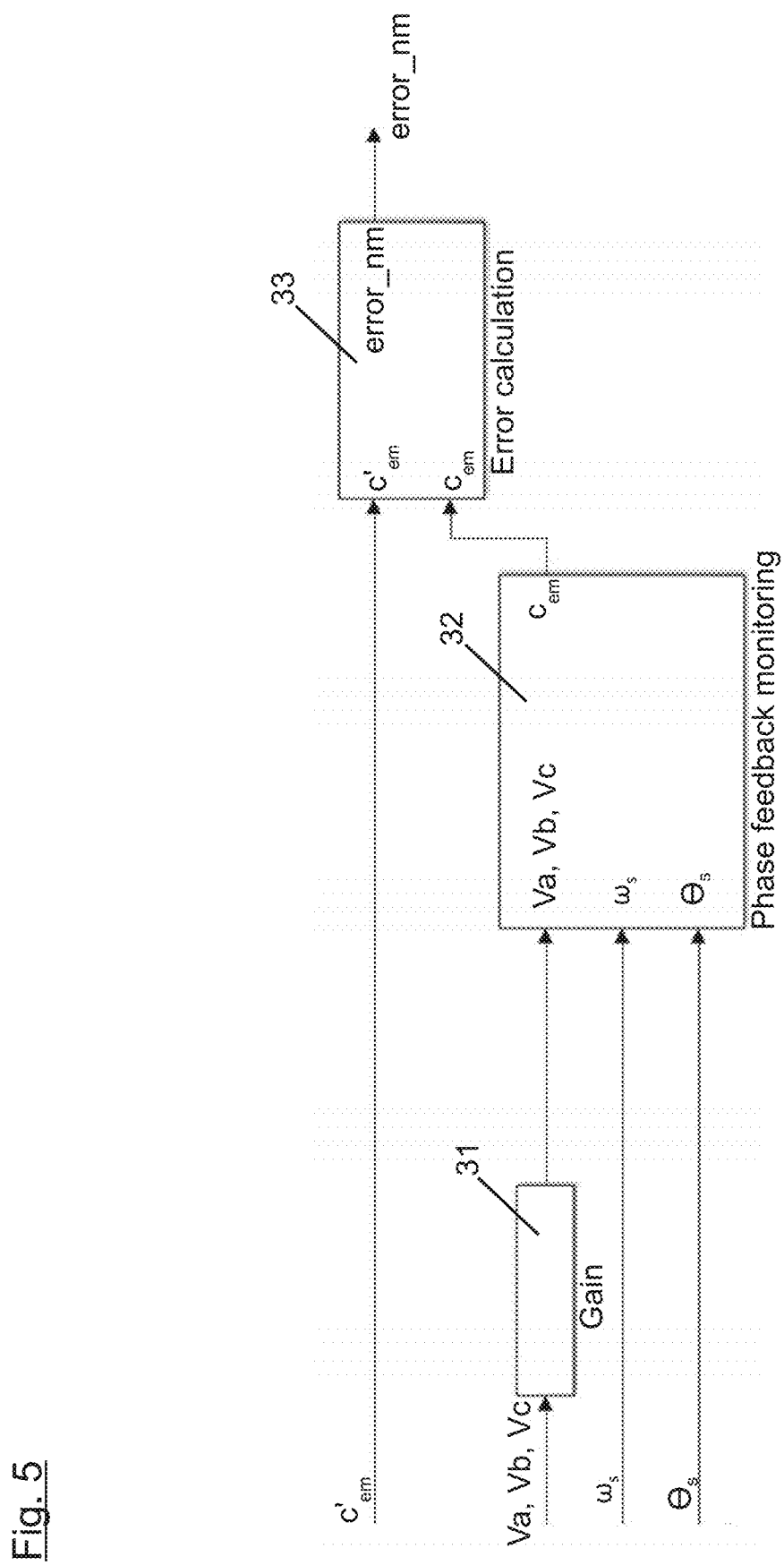
FIG. 5 is a block diagram of the software modules of a device according to the invention.
Figure 6:
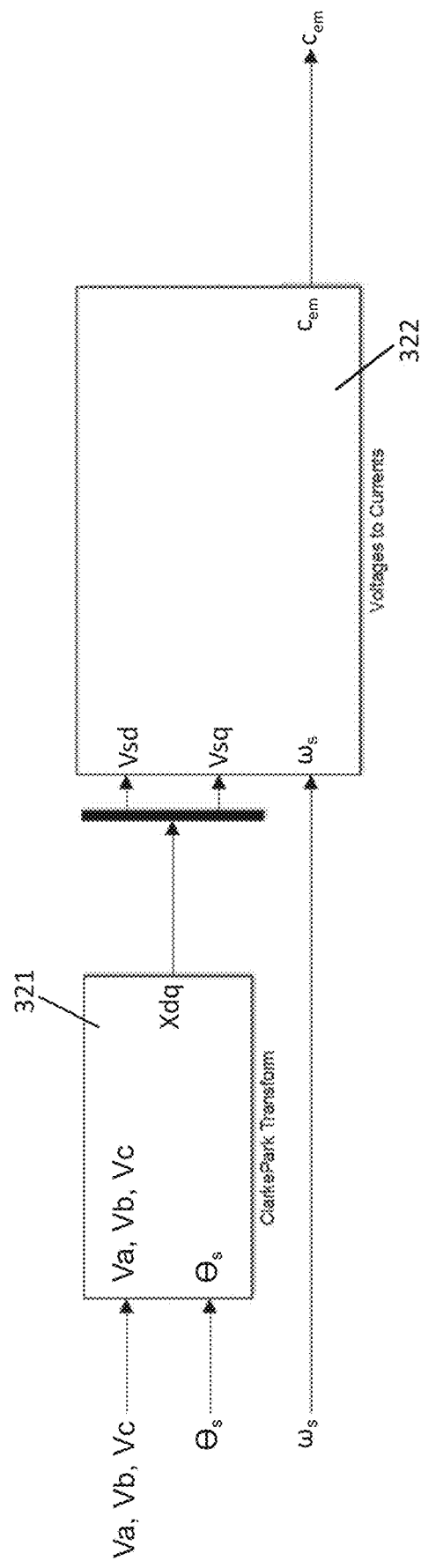
FIG. 6 is a block diagram of a phase feedback monitoring module of the device.
Figure 7:
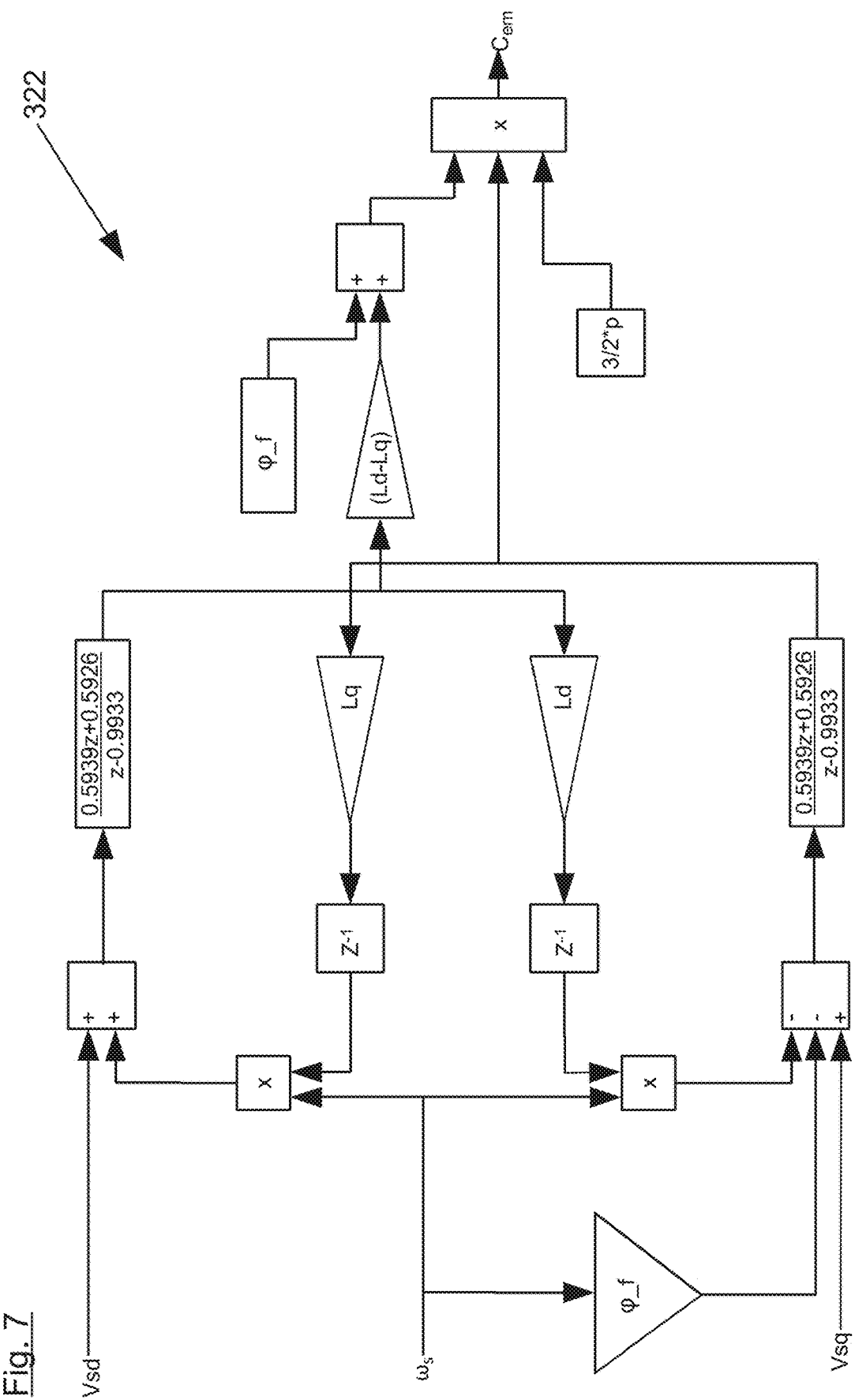
FIG. 7 is a block diagram of a calculation module for calculating the torque in the d/q space.

In the programmable integrated circuit 3, the input variables of various software modules schematically represented in FIGS. 5 to 7 are processed to calculate the output variable, namely the torque observed by the device and the deviation of the torque observed by the device from the known torque.

The voltages Va, Vb, Vc present at the analog inputs are first converted into digital signals in circuit 3. The discretization is done with a clock, which is given by the PWM signal, which is used to generate the voltages over the windings of the motor. The time points of discretization are selected so that discretization always takes place in the middle of a pulse and/or in the middle of a pulse pause. Ideally, the value obtained by discretization should be on a voltage curve corresponding to the alternating voltage with which the brushless AC motor could be operated to achieve the same speed and torque.

The discretized voltages Va, Vb, Vc are digitally amplified to compensate for the errors caused by the analog filtering by filter 2. The amplifiers used for the amplification are means for compensating for faults. The result is digital voltage signals which result in the unfiltered analog voltage signals cleaned of harmonics. The bodediagram shows the amplitude response of this digital gain with the reference characters A_V and the frequency response with the reference character F_V. A superposition of the transfer functions produces an almost horizontal result A_R, F_R. The errors of the analog filtering can thus be almost compensated.

The voltage signals amplified in this way are fed to a module 32 in which the torque is determined from the voltages across the windings, also known as phase voltages, the angular velocity of the rotor of the motor and the pole wheel angle of the rotor (pole wheel). In FIG. 5, this module 32 is also referred to as the "phase feedback module". The phase feedback module 32 forms an observer for observing the torque without being able to measure the torque directly.

This phase feedback module 32 can in turn be divided into two software modules (FIG. 6), namely a transformation module 321 and a calculation module 322.

A Clarke Park transformation is performed in the transformation module 321 so that further calculations can be performed in d/q space. The image sizes Vsd and Vsq are obtained in the d/q space from the digitized and amplified voltages Va, Vb, Vc and the polar wheel angle. These are included in the further calculation by the calculation module 322 as well as the angular velocity.

The calculation within the calculation module can be understood from FIG. 7. The calculation depends on several parameters given by the motor, namely the parameters Ld direct inductance in the d/q space, Lq quadratic inductance in the d/q space, R phase resistance, p number of pole pairs, and $\varphi\_f$ rotor magnet flux.

From the torque calculated or observed by the calculation module 322 and the previously known torque, the difference error_nm, i.e. the deviation of the torques determined on the various paths, is then determined in the error calculation module 33 and made available at the output of the integrated circuit 3.

REFERENCE SIGN LIST 1 voltage divider
2 analog filters
3 integrated circuit
31 amplifier 32 phase feedback module
33 error calculation module
321 transformation module
322 calculation module

The invention claimed is:

1. A torque monitoring device for a brushless AC motor comprising:
an observer configured to:
receive voltages (Va, Vb, Vc) across windings of the brushless AC motor;
receive an angular velocity ($\omega\_s$) of a rotor of the brushless AC motor;
receive a pole wheel angle ($\theta\_s$) of the brushless AC motor; and
determine a torque of the brushless AC motor based on the voltages, the angular velocity, and the pole wheel angle, wherein the torque is determined without using a phase current.

2. The device according to claim 1, wherein the observer has inputs for the voltages (Va, Vb, Vc) across windings of the brushless AC motor.

3. The device according to claim 2, wherein the device comprises low-pass filters for the voltages over the windings of the brushless AC motor.

4. The device according to claim 3, wherein the device comprises means for compensating for faults, by means of which faults caused by filtering with the low-pass filter can be compensated.

5. The device according to claim 2, wherein the device comprises analog-to-digital converters connected to the inputs for converting analog input quantities into digital input quantities.

6. The device according to claim 2, wherein the observer comprises a transformation module for converting the voltages across the windings of the brushless transformer into voltages in a d/q space.

7. The device according to claim 6, wherein the observer has a torque calculation module for calculating the torque from the voltages in the d/q space and the angular velocity.

8. The device according to claim 7, wherein the torque calculation module takes the following characteristic values of the brushless AC motor into account in the calculation of the torque: Ld direct inductance in the d/q space, Lq quadratic inductance in the d/q space, R phase resistance, p number of pole pairs, and $\varphi\_f$ rotor magnet flux.

9. The device according to claim 7, wherein the device has a means for error calculation with which a difference can be calculated from the calculated torque to a measured torque.

10. The device according to claim 1, wherein the observer has an input for the angular velocity ($\omega\_s$) of a rotor of the brushless AC motor and an input for the pole wheel angle ($\theta\_s$) of the brushless AC motor.

11. The device according to claim 1, wherein the observer is a program or a part of a program which can be executed by means of an integrated circuit.

12. A method for monitoring torque of a brushless AC motor, the method comprising the steps of:
detecting voltages via windings of the brushless AC motor;
detecting a pole wheel angle and an angular velocity of a rotor of the brushless AC motor;
transforming the pole wheel angle and the voltages into voltages in a d/q space; and
calculating the torque of the brushless AC motor from the voltages in the d/q space and the angular velocity wherein the torque is calculated without using a phase current.

* * * * *